Inventor
Frank P. Zierden
By Wheeler, Wheeler, House & Clemency
Attorneys

United States Patent Office 3,456,964
Patented July 22, 1969

3,456,964
LOW TORQUE PIPE SWIVEL
Frank P. Zierden, Milwaukee, Wis., assignor to The Zierden Co., Milwaukee, Wis., a corporation of Wisconsin
Filed Aug. 4, 1967, Ser. No. 658,505
Int. Cl. F16l 17/00, 43/00, 27/04
U.S. Cl. 285—98                                    4 Claims

ABSTRACT OF THE DISCLOSURE

In a swivel pipe joint, relatively rotatable inlet and outlet members have anti-friction bearing means defining an axis of relative rotation. One of said members has a generally radial seal surface which is coaxial with the bearing means and through which flow passes. The complementary seal member is an annular plug which is hemispherical and has a complementary female socket in the other of said members. An O-ring on the plug seals the plug to the socket, permitting the plug to adjust itself so that the generally radial seal surfaces on the plug and the rotatable member are tight in all positions of rotation of the rotatable member on said anti-friction bearing.

BACKGROUND OF THE INVENTION

United States patents to Deubler 2,723,136 and McLaughlin 1,915,100 are the closest art known to me. Deubler shows anti-friction bearings with laterally self-adjusting planar seal and McLaughlin shows spherical bearing for swivel purposes, with sealing means, but without the anti-friction feature.

As compared with these and any other prior art swivels or rotating unions, the swivel device herein disclosed operates with extremely low torque and yet maintains an excellent seal between the relatively movable parts.

Typically, resistance to rotation in a pipe swivel increases with pressure. Both in air hose connections and in water connections, it is quite common in garage installations to have the swivels become very difficult of manipulation. In contrast, the swivel of the instant invention rotates with very low torque and still maintains a tight seal beween he relatively movable male and female pipe parts. The O-ring used between the non-rotating male and female plug and bushing not only seals these parts but provides all needed axial thrust to hold the relatively rotatable surfaces in sealed engagement.

SUMMARY OF THE INVENTION

The remarkably low torque encountered in the use of the swivel herein disclosed is attributed in part to the arrangement whereby a tubular spindle connected with the outlet pipe has an anti-friction bearing support and a radial surface against which seats an annular sealing plug through which the inlet flow is communicated to the spindle. The plug and its complementary bushing respectively have male and female spherical surfaces coaxial with the antifriction bearing. The plug and bushing do not have relative rotation but are self-adjusting to compensate for even the slightest irregularity in the anti-friction bearing, thus permitting the radial seal surfaces of the spindle and plug to remain in an effective sealing engagement. A seal between the spherical surfaces of the plug and the bushing is provided by an elastomeric O-ring. Pressure of fluid traversing the swivel, and also the thrust of the O-ring, are exerted on the plug to hold its sealing surface in operative sealing contact with the complementary radial surface of the spindle.

DESCRIPTION OF PREFERRED EMBODIMENTS

Figure 1:
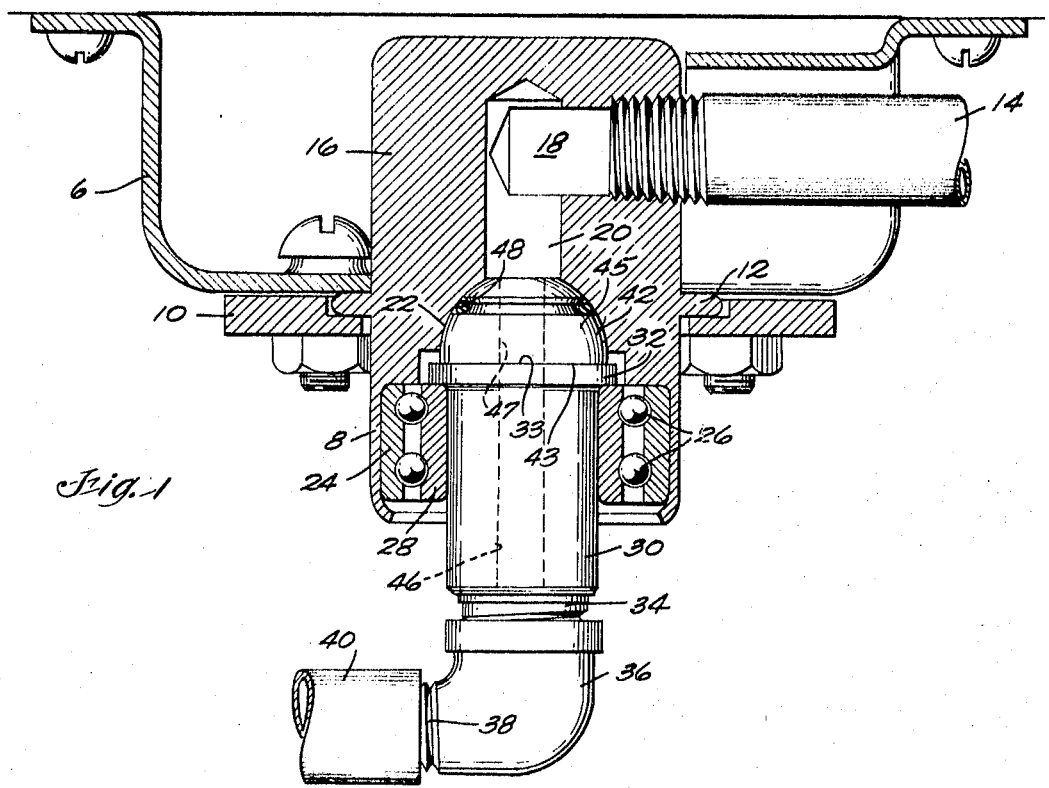
FIG. 1 is a view in axial section through a ceiling-mounted low torque swivel embodying the invention.

A cup-shaped ceiling mounting fixture 6 is centrally apertured to receive a bushing 16 held to the fixture 6 by means of a clamp plate 10 engaged with an exterior flange 12 with which the bushing 16 is provided.

The pressure supply line 14 is screwthreaded into bushing 16 providing a passage which is in communication with a bore 18 which intersects a bore 20 penetrating the bushing. Bushing 16 has a hemispherical female bearing surface 22 coaxial with bore 20.

An outer ballbearing race 24 is fitted into the skirt portion 18 of the bushing and provides support for the bearing balls 26 which are confined between the outer race 24 and an inner race 28 on which the tubular spindle 30 is mounted by means of its flange 32. A nipple 34 connects the discharge pipe 30 with elbow 36. The elbow is connected by nipple 38 with a radial delivery pipe 40 with which a hose (not shown) is usually connected.

The flange 32 at the upper end of spindle pipe 30 has a generally radial bearing surface 33 for which the annular plug 42 provides a complementary radial bearing surface 43. This plug has an external spherically finished bearing surface 45 complementary to the female bearing surface 22 of the bushing 16. The center about which the surfaces 22 and 45 are spherically convex is preferably at the level of the generally radial sealing surfaces 33 and 43 between the spindle 30 and the plug 42.

The spindle 30 and the plug 42 have registering openings at 46 and 47 for the passage of fluid from bore 20 to the delivery pipe 40.

The generally radial surfaces 33 and 43 provide an effective seal between the rotatable spindle 30 and the normally non-rotating plug 42. The spherical form of the external surface 45 of the plug permits it to pivot in the complementary female surface 22 of the bushing to accommodate any inaccuracies in spindle rotation while, at the same time, the thrust of transmitted fluid and the elastomeric reaction of the O-ring seal 48 maintain surfaces 33 and 43 in effective sealing engagement. O-ring 48 additionally performs the conventional function of sealing the male and female spherical surfaces of the plug and bushing.

Figure 2:
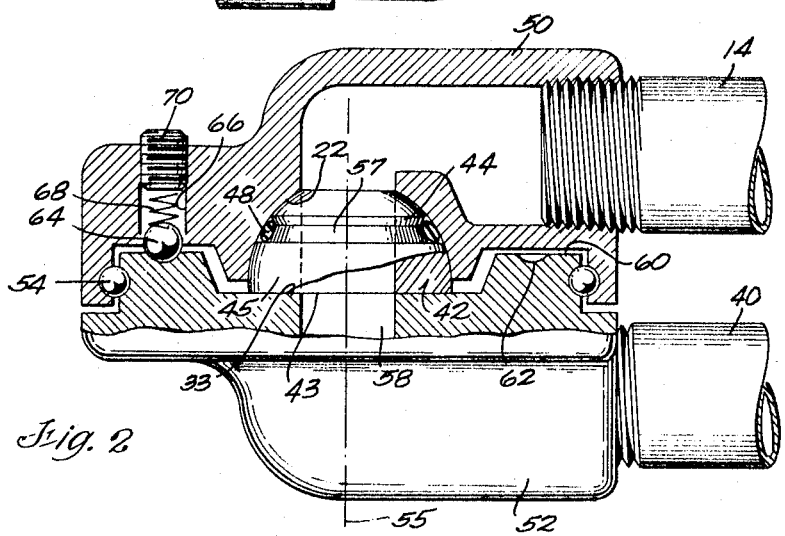
FIG. 2 is a view partially in side elevation and partially in axial section through a floating swivel union embodying the invention.

In the construction shown in FIG. 2, the inlet and outlet fittings 50 and 52 have ballbearings at 54 which pivot the fittings for relative rotation upon a fixed axis 55. In this construction, the female spherical surface 22 is provided directly in fitting 50. As in the previous construction, a plug 42 provides a spherical male bearing surface at 45 complementary to surface 22 and sealed by an O-ring 48. Also similar to the construction first described is the provision at the bottom of plug 42 of a substantially radial and substantially flat sealing surface 43 which engages the complementary sealing surface 33 of the fitting 52. Openings 57 and 58, through the plug 42 and the spindle portion which provides bearing surface 43 of the fitting 52 provide communication between the inlet pipe 14 and the delivery pipe 40.

The surfaces 33 and 43 provide a seal which accommodates relative rotation between fittings 50 and 52. The seal provided by the O-ring 48 permits self-adjustment of the plug 42 so that its surface 43 remains in effective sealing engagement with the complementary surface 33.

In both constructions disclosed, anti-friction bearings make it possible to rotate the delivery pipe freely and with little torque respecting the inlet. The spherical and relatively non-rotatable bearing surfaces of the plug and the bushing or fitting engaged thereby make it practicable to use anti-friction bearings in a device of this character without loss of seal.

An incidental feature is the provision of a detent for impositively maintaining the swiveled parts 50 and 52 in any desired angular position. For this purpose, the surface 60 of fitting 52 is provided at intervals with any desired number of shallow pockets 62 to receive a detent member 64 (in this case a ball) mounted in its own bore 66 in fitting 50 at a distance radially remote from the axis of rotation 55. The ball is urged downwardly into a position for engagement with any registering pocket 62 by a compression spring 68 seated against set screw 70 in threaded connection with fitting 50.

It will be understood that the direction in which the inlet or the delivery pipes enter or leave the respective fittings is a matter of choice.

What is claimed is:

1. A swivel pipe joint for transporting fluids therethrough comprising a first member having an inlet pipe connection and a substantially spherical female bearing surface and an inlet passage leading centrally to said surface from said inlet pipe connection, a relatively rotatable second member having an outlet pipe connection, an anti-friction bearing which mounts the rotatable member on the first member and with which said female spherical surface is coaxial, a plug having a spherical male surface complementary to the female surface and engaged therein, a compressed elastomeric O-ring encircling the male surface at an intermediate level and engaged with the female spherical surface, said rotatable member and plug having complementary relatively rotatable planar, radially extending sealing surfaces subject to the reaction bias of the O-ring and supporting the plug from the rotatable member and providing a seal therebetween, the said spherical surface of the plug extending convexly away from said planar sealing surfaces, and the plug and the rotatable member further having communicating passages opening through said sealing surfaces and providing communication between the inlet pipe connection of the first member and the delivery pipe connection of the second member, the said spherical surfaces of the plug and the first member being concentric about a point which is substantially on the axis of rotation of the second member and at the level of said sealing surfaces, said O-ring and the fluid transported through the swivel joint providing the sole means of urging said plug planar sealing face toward and into sealing engagement with said planar sealing face of said rotatable member.

2. A swivel pipe joint comprising a first member having an inlet pipe connection and a substantially spherical female bearing surface and an inlet passage leading centrally to said surface from said inlet pipe connection, a relatively rotatable second member having an outlet pipe connection, an anti-friction bearing which mounts the rotatable member on the first member and with which said female spherical surface is coaxial, the first and second members having complementary annular races for the anti-friction bearing means, a plug having a spherical male surface complementary to the female surface and engaged therein, a compressed elastomeric O-ring encircling the male surface at an intermediate level and engaged under pressure between the plug and the female spherical surface, said rotatable member and plug having complementary relatively rotatable planar radially extending sealing surfaces subject to the reaction bias of the O-ring and supporting the plug from the rotatable member and providing a seal therebetween, the said spherical surface of the plug extending convexly away from said planar sealing surfaces, and the plug and the rotatable member further having communicating passages opening through said plug and said sealing surfaces and providing communication between the inlet pipe connection of the first member and the delivery pipe connection of the second member, the said spherical surfaces of the plug and the first member being concentric about a point which is substantially on the axis of rotation of the second member and at the level of said sealing surfaces, a detent mounted on one of said members and for which the other said member has shallow recesses at a radius to be engaged by the detent when the detent is in registry therewith, means biasing the detent toward said other member and urging the detent resiliently into respective recesses with which it registers.

3. A swivel pipe joint according to claim 1 in which the anti-friction bearing comprises inner and outer races, the first member having a skirt portion engaging the outer race and the second member comprising a spindle having a flange engaging the inner race and supported thereby.

4. A swivel pipe joint according to claim 1 in which the first and second members respectively provide races for the anti-friction bearing means, which races are annular and coaxial with an axis drawn through the male and female bearing surfaces in the direction of flow for said passages.

References Cited
UNITED STATES PATENTS

| | | | |
|---|---|---|---|
| 1,446,006 | 2/1923 | Fletcher | 285—276 X |
| 1,825,774 | 10/1931 | Boynton | 285—280 X |
| 1,915,100 | 6/1933 | McLaughlin | 285—266 |
| 2,723,136 | 11/1955 | Deubler | 285—276 X |
| 2,793,058 | 5/1957 | Jacobson | 285—278 X |
| 2,805,086 | 9/1957 | Shumaker | 285—279 X |
| 3,058,761 | 10/1962 | Christophersen | 285—281 |
| 3,332,709 | 7/1967 | Kowalski | 285—23 |

MARION PARSONS, Jr., Primary Examiner

DAVE W. AROLA, Assistant Examiner

U.S. Cl. X.R.

285—181, 261, 276, 281